United States Patent [19]

Hunt et al.

[11] 3,860,248

[45] Jan. 14, 1975

[54] RECORD MEMBER APPARATUS

[75] Inventors: Ronald Eugene Hunt, Austin; William Melchior Jenkins, Leander, both of Tex.

[73] Assignee: International Business Machines Corporation, Armonk, N.Y.

[22] Filed: Apr. 20, 1973

[21] Appl. No.: 353,182

[52] U.S. Cl. ................ 274/1 R, 274/42 R, 206/309

[51] Int. Cl. .......................... G11b 1/02, G11b 3/68

[58] Field of Search ............. 274/42, 41, 1 R, 42 R, 274/42 P, 41 R, 41 A; 360/133, 135, 97; 206/309

[56] References Cited

UNITED STATES PATENTS

| | | | |
|---|---|---|---|
| 2,555,594 | 6/1951 | Markovitz | 274/42 |
| 3,083,269 | 3/1963 | Gaubert | 360/93 |
| 3,730,602 | 5/1973 | Campbell | 206/309 |
| 3,761,097 | 9/1973 | Borman | 360/93 |

FOREIGN PATENTS OR APPLICATIONS

| | | | |
|---|---|---|---|
| 1,116,701 | 6/1968 | Great Britain | 206/309 |

*Primary Examiner*—Richard E. Aegerter
*Assistant Examiner*—A. J. Mirabito
*Attorney, Agent, or Firm*—James H. Barksdale, Jr.

[57] ABSTRACT

An apparatus for receiving and storing a number of record members and adapted to have record members unloaded therefrom. The apparatus is comprised of a housing having cooperating top and bottom enclosures which form a front opening for loading and unloading a number of record members, and a side opening for loading one record member. Arcuate recesses form part of the front opening for facilitating manual loading of record members. Elongated slots open in each arcuate recess for facilitating mechanical unloading. Further, the housing has an orientation and guide rib for insuring proper orientation and guiding for such purposes as mechanical loading and unloading. In addition, the housing has a worm groove opening adjacent the front opening which cooperates with associated structure for insuring proper positioning for mechanical unloading.

14 Claims, 8 Drawing Figures

RECORD MEMBER APPARATUS

CROSS-REFERENCES TO RELATED APPLICATIONS

U.S. Patent Application Ser. No. 209,667, filed Dec. 20, 1971, entitled "Cartridge Particularly Suitable for Disc Record Member," having Jesse L. Campbell, Walter F. Klein, and Denis E. Lowry as inventors, now U.S. Pat. No. 3,730,602, issued May 1, 1973.

U.S. Patent Application Ser. No. 209,800, filed Dec. 20, 1971, entitled "Dictation Apparatus with Disc Loading, Feeding, and Ejecting Feature," having James D. Bruer, Donald L. Buddington, and Walter F. Klein as inventors, now U.S. Pat. No. 3,789,160, issued Jan. 29, 1974.

U.S. Design Patent Application Ser. No. 258,913, filed June 1, 1972, entitled "Magnetic Disc Cartridge Jacket," having Ronald E. Hunt and William M. Jenkins as inventors, now U.S. Pat. No. D229,427, issued Nov. 27, 1973.

U.S. Patent Application Ser. No. 306,272, filed Nov. 13, 1972, entitled "Disc Unloading Apparatus," having William M. Jenkins as inventor, now U.S. Pat. No. 3,823,948 issued July 16, 1974.

U.S. Patent Application Ser. No. 310,314, filed Nov. 29, 1972, entitled "Information Media Handling System," having Ronald E. Hunt and William M. Jenkins as inventors.

BACKGROUND OF THE INVENTION

1. Field of the Invention

This invention relates to record media handling and storage in general. More specifically, this invention relates to an apparatus particularly adapted for receiving, storing, and having record members removed therefrom.

2. Description of the Prior Art

Heretofore, the primary disadvantage of record member storage facilities has been operator handling of the storage facilities and the record members. Another disadvantage is that operator manipulations of attachments have been required to unload the storage facility. Representative of the closest known prior art related to storage and/or dispensing are U.S. Pat. Nos. 1,741,295; 3,090,089; 3,061,085; 3,415,365; 2,152,174; 2,840,642; 2,725,143; 2,555,594; 3,609,722; D206,382; and the card holder shown on page 229, Hurst Printing Co., 1971 Office Supply Catalog. The first referenced patent was cited during the prosecution of the above cross-referenced application Ser. No. 209,667. This patent (Haberer) describes a cabinet for loading, storing, and ejecting tongue depressors. The Haberer device includes a slider member arranged for ejection of individual depressors, one at a time, through a discharge slot. A significant difference between the Haberer teaching and the present case is that it is necessary for loading of items in the Haberer cabinet to remove the cover completely, or at least far enough in order to place the depressors in position under a follower plate. Another significant difference is that ejecting in Haberer requires operator manipulation of the slider member. The apparatus of this invention requires a minimum of operator effort and record member handling in that it is particularly adapted for cooperation with an automatic record member handling apparatus such as a dictation apparatus. In this way contamination of record members is substantially reduced and the overall handling operation is substantially improved from a human factors standpoint. The second referenced patent shows a dispenser and sterilizer for clinical thermometers in which the thermometers are loaded and ejected at right angles. Operator manipulation is required for dispensing. The third, fourth, and fifth references show containers for flat media having a spring to hold the media in place. The fourth reference also has an arcuate recess. The sixth reference discloses a transducing assembly. The seventh and eighth references disclose containers for flat media and these containers have elongated slots. The ninth and tenth references are cited as being of interest. The last reference discloses a flexible card holder having arcuate recesses. Insofar as such references may be analogous to the present apparatus, they are not considered to be anticipatory.

SUMMARY OF THE INVENTION

With the apparatus of this invention record members can be inserted, stored, and unloaded with a minimum of operator handling and manipulation. Top and bottom enclosures cooperate to form a housing having a top, a bottom, sides, a back and a front opening. The front opening is defined by elongated slots opening in bevelled edged arcuate recesses in the top and bottom. One of the sides has an opening for receiving record members, one at a time. Within the apparatus is a record member retainer for releasably maintaining record members in the apparatus and preventing the record members from exiting through the front opening during normal handling. Associated with the side opening is a bevelled surface having a sufficient angle relative to the opening and the top to prevent exiting of record members through this opening during normal handling. This apparatus is particularly suitable for use with record member handling systems having capabilities for automatically and mechanically loading and unloading record members.

DESCRIPTION OF THE PREFERRED EMBODIMENT

Figures 1, 2, 3, 4, 5, 6, 7, 8:
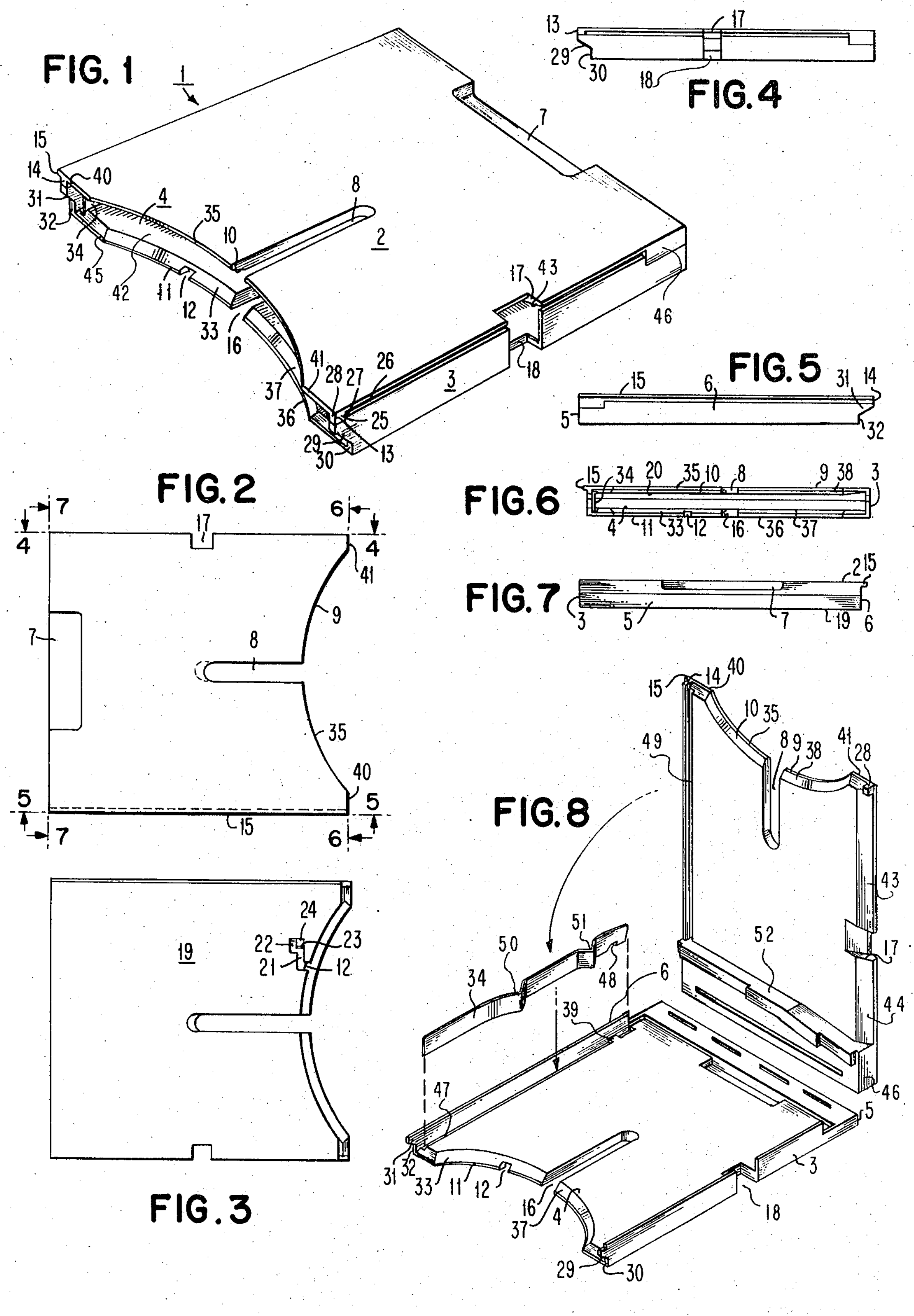
In FIG. 1 there is shown in perspective the apparatus of this invention.
In FIG. 2 there is shown a top plan view of the apparatus of this invention.
In FIG. 3 there is shown a bottom plan view of the apparatus according to this invention.
In FIG. 4 there is shown a side view taken along lines 4—4 of FIG. 2.
In FIG. 5 there is shown another side view taken along lines 5—5 of FIG. 2.
In FIG. 6 there is shown a front view taken along lines 6—6 of FIG. 2.
In FIG. 7 there is shown a back view of the apparatus taken along lines 7—7 of FIG. 2; and In FIG. 8 there is shown in perspective an exploded view of the apparatus according to this invention.

Referring now to the several figures making up the drawing, there is shown the apparatus of this invention which can be generally defined as a housing or a cartridge designated by reference numeral 1. The apparatus 1 is made up of a top 2 and a bottom 19 which cooperate, when bonded together, to form an enclosure for receiving and storing record members such as magnetic recording discs having a central aperture. Magnetic recording discs having a central aperture and used in conjunction with apparatus 1 are shown and described in U.S. Pat. No. 3,823,948. Top 2 and bottom 19 can be molded polymeric materials. As formed, top 2 has a depressed area 7 which can serve as a handle for an operator when using apparatus 1 in conjunction with the apparatuses disclosed in U.S. Pat. Nos. 3,789,160 and 3,823,948 and U.S. Pat. Application Ser. No. 310,314.

With top 2 and bottom 19 bonded together as shown in FIGS. 1–7, a front (side) opening 42 is formed opposite the end of apparatus 1 having handle 7. This opening 42 is of sufficient size to accommodate and allow insertion of a number of record members into apparatus 1.

Top 2 has recesses 9 and 35 which form a generally arcuate surface adjacent front opening 42. Bottom 19 also has recesses 11 and 36 which also form a generally arcuate surface adjacent front opening 42. For the majority of applications a substantially arcuate surface will suffice. Recesses 9, 11, 35, and 36 are for facilitating manual unloading of record members from apparatus 1 by an operator. That is, when a magnetic recording disc is inserted into apparatus 1 and positioned against the back wall 52 as best shown in FIG. 8, a portion of the disc will extend beyond recesses 9, 11, 35, and 36 and can be grasped by the operator for withdrawing it from apparatus 1. For this manual operation, the least distance between the recesses and back 52 will be less than the diameter of the discs.

As best shown in FIGS. 3 and 5, the front outer extremity of top 2 extends beyond the front outer extremity of bottom 19. This arrangement can be used alternately, or in conjunction with later described rib 15 for orientation purposes.

The inside edges of recesses 9, 11, 35, and 36 have beveled portions 38, 33, 10, and 37, respectively. These beveled portions are for facilitating the manual loading of record members into apparatus 1. That is, when a stack of record members is grasped by an operator about one edge, the total integrity of the stack may not be maintainable about an opposite edge. In this instance, the beveled portions will serve to guide an edge of the stack into apparatus 1. Top 2 and bottom 19 also have recesses 8 and 16, respectively, which are elongated slots opening in front opening 42 and communicating with recesses 9, 11, 35, and 36.

Further, recess 11 is structured to function in conjunction with the information media handling system of U.S. Patent Application Ser. No. 310,314. When so utilized, that portion of recess 11 extending from edge 45, as best shown in FIG. 1, will serve as a guide leading to worm groove opening 12.

As can be appreciated, orientation of the information media handling system of U.S. Patent Application Ser. No. 310,314 can be reversed such that worm groove opening 12 and the remainder of the worm groove (FIG. 3) can be in top 2 and positioned along recess 35. In this instance, a workable embodiment can be provided having only recess 35 and recess 8. If so structured, recess 8 could readily accommodate the disc unloading apparatus of U.S. Patent and at the same time recess 35 could provide operator access to the record members for withdrawing them from apparatus 1.

When an apparatus similar to that disclosed in U.S. Pat. No. 3,823,948 is structured such that record members are released prior to complete withdrawal of apparatus 1 during an unloading operation, then recesses 11 and 36 are required in the absence of other record member holding means. These recesses will prevent the record members from being frictionally withdrawn from the loading station under the influence of inside surface 4 of bottom 19. That is, during withdrawal of apparatus 1, the record members will no longer be in contact with surface 4 when released.

With top 2 and bottom 19 bonded together to form apparatus 1, a side slot or opening 26 is formed at substantially right angles to opening 42. Opening 26 is formed by upright side 3 of bottom 19 and downwardly depending appendages 25 and 46 of top 2. Appendage 46 also forms part of the back of apparatus 1; being integral with back 52. Appendage 46 will cooperate in a tongue and groove manner with the back portion 5 of bottom 19. The exterior of back 5 is smooth; providing a writing area for identifying record members to be stored in apparatus 1. Opening 26 is of sufficient width to accommodate and permit insertion and passage therethrough of at least one record member. This opening is utilized when, for example, a record member is to be mechanically inserted by an apparatus such as that disclosed in U.S. Pat. No. 3,789,160.

Should the material being used for forming apparatus 1 be of sufficient rigidity and/or apparatus 1 normally be subject to minimum stresses, then appendage 25 can be eliminated to insure no malfunction when a record member is mechanically inserted into apparatus 1 through opening 26. That is, opening 26 can be extended beyond present forward terminus 27 to provide a wider passage by eliminating appendage 25. In this case, inner surface 20 of top 2 will remain as shown in FIG. 8.

Also formed by top 2 and bottom 19 is another opening defined by cutouts 17 and 18, respectively. This opening is for such purposes as accommodating a loading apparatus for mechanically loading record members into apparatus 1.

Associated with opening 26 are beveled areas 43 and 44 in top 2. These areas are beveled at a sufficient angle to prevent a record member from exiting through opening 26 during normal operator handling of apparatus 1. These areas serve the same function as spring 8 in U.S. Pat. No. 3,730,602. That is, the record members contemplated for use in apparatus 1, although resilient to some extent, tend to remain generally planar. With nothing in apparatus 1 to flex or bend the record members and with a sufficient angle for beveled areas 43 and 44, the record members will be effectively maintained in apparatus 1. The record member retainer 34, which is a leaf spring, and which will be described in more detail later in the specification, serves primarily to releasably maintain record members in apparatus 1 and prevent them from exiting through opening 42 during normal handling.

Along one edge of the top 2 is an outwardly extending orientation and guide rib 15. This is for guiding and insuring proper orientation of apparatus 1 when inserted into apparatuses such as disclosed in U.S. Patent Application Ser. No. 310,314, and U.S. Pat. Nos. 3,789,160, 3,823,948 and cooperating means are provided therefor.

From the discussion above relative to providing an apparatus having only recess 35 and recess 8, inside surface 4 of bottom 19 will necessarily have to be structured to accommodate the apparatus of U.S. Pat. No. 3,823,948. That is, a smooth flat surface 4 will insure that all record members are unloaded from apparatus 1.

Top 2 has other structural parts such as depending flange 14 and flat edges 40 and 41. Depending flange 14 is for cooperating with upright side 6 of bottom 19. Edge 40 extends sufficiently forward to alleviate the possibility of an operator encountering record member retainer 34. Edge 41 forms part of leading edge 28 for actuating the apparatus disclosed in U.S. Pat. No. 3,823,948. Edge 40 also serves as an abuttment for ejecting apparatus 1 from the apparatus disclosed in Ser. No. 310,314. Should the apparatus of U.S. Pat. No. 3,823,948 hinged elevatable disc weight, then edges 40 and 41 will serve to cam this weight up and out of the path of the incoming record members.

Upright side 3 of bottom 19 has a forwardly protruding extension 29 forming part of the leading edge 28. Upright side 6 (FIG. 8) of bottom 19 also has extension 31 for cooperating with depending flange 14 when top 2 and bottom 19 are bonded together. Lower leading edges 30 and 32 can serve to control the extent of travel of apparatus 1 into a record member handling apparatus such that, with discs abutting back 52, the central apertures in the discs will be aligned to facilitate their removal. By also providing cooperating abuttment means for edges 30 and 32, the possibility of damage to the apparatus disclosed in U.S. Patent Application Ser. No. 310,314 will be eliminated. This is particularly the case when there is a tendency for an operator to use excessive force.

The worm groove (FIG. 3) defined by opening 12, a first transverse portion 21, a second transverse portion 22, a separator rib 23, and a ramp portion 24, is for use in conjunction with the apparatus disclosed in U.S. Patent Application Ser. No. 310,314. The groove in the instant application is different in shape than that provided in the previously referenced application. Different depression levels are now provided for proper positioning and ejecting. The first depression level defined by the first transverse portion 21 is for proper positioning during the loading of record members into apparatus 1. The second transverse portion is utilized during an ejecting operation in essentially the same manner described in the previously referenced application.

Referring again to record member retainer 34, this is a leaf spring structured to prevent inadvertent exiting of record members from apparatus 1 during normal handling. That is, with record members positioned in apparatus 1, retainer 34 acts to releasably maintain the record members in apparatus 1. During assembly, retainer 34 is positioned in groove 47 (FIG. 8) with hook 48 fitting over block 39. Then top 2 is fitted into place with the upper part of retainer 34 fitting in groove 49. Grooves 47 and 49 are a sufficient width to accommodate detents 50 and 51 of retainer 34, with block 39 maintaining retainer 34 in apparatus 1. When discs are used in conjunction with apparatus 1, the discs are releasably maintained therein with their outer periphery acting against upright side 3 of bottom 19 and extending betwen detents 50 and 51.

From the above, opening 42 is for receiving record members through manual means and for having record members removed therefrom both manually and mechanically. Opening 26 is for having record members inserted into apparatus 1 primarily through mechanical means. Recesses 9, 11, 35, and 36 are for facilitating manual and mechanical unloading of apparatus 1. Recesses 8 and 16 are for cooperating with mechanical apparatus for unloading record members from apparatus 1. In operation and use, an operator will initially manually load a number of record members into apparatus 1 through opening 42. Thereafter, apparatus 1 is inserted into the input hopper or loading station of U.S. Pat. No. 3,789,160 record members are then automatically unloaded from apparatus 1 by the apparatus of U.S. Pat. No. 3,823,948. The next step is for the operator to withdraw apparatus 1 from the loading station and insert it into the unloading station or output hopper of U.S. Pat. No. 3,789,160. Apparatus 1 is inserted into the output hopper until held by the apparatus of Ser. No. 310,314 cooperating with worm groove opening 12. Record members which are to be reloaded into apparatus 1 are then mechanically inserted, one at a time, through slot 26 by the apparatus of U.S. Pat. No. 3,789,160 apparatus 1 has been reloaded, the operator will withdraw apparatus 1 for (1) such purposes as, (2) reinsertion into the input hopper, (3) unloading record members through opening 42, etc.

In summary, an apparatus is provided which is not only useable for receiving, storing, and having record members withdrawn therefrom, but also is structured to perform multiple functions when used with associated record member handling apparatuses. Top and bottom enclosures cooperate to form a housing having a top, a bottom, sides, a back, and a front opening for loading and unloading record members. The front opening is defined by elongated slots opening in bevelled-edged recesses in the top and the bottom. One of the sides has an opening for receiving record members, one at a time. Within the apparatus is a record member retainer for releasably maintaining record members and preventing the record members from exiting through the front opening during normal handling. Associated with the side opening is a bevelled surface having a sufficient angle relative thereto to prevent exiting of record members through the side opening during normal handling.

While the invention has been particularly shown and described with reference to a particular embodiment, it will be understood by those skilled in the art that various changes in form and detail may be made without departing from the spirit and scope of the invention.

What is claimed is:

1. An apparatus for receiving and storing a number of record members, and adapted to have said record members unloaded therefrom, said apparatus comprising a housing made up of top and bottom enclosures and having:

a. a first side opening of sufficient size to allow insertion of said number of record members thereinto;

b. a second side opening of sufficient size to allow passage of one of said record members therethrough;

c. a recess in said top enclosure communicating with said first side opening for facilitating mechanical unloading;

d. a groove in the bottom of said bottom enclosure extending from adjacent said first side opening and having a ramp, said groove serving as means for positioning said apparatus for mechanical loading; and e. orientation means for insuring proper orientation for mechanical loading and unloading.

2. An apparatus according to claim 1 further comprising retaining means for releasably maintaining said record members therein.

3. An apparatus according to claim 1 further comprising actuating means for initiating mechanical unloading.

4. An apparatus for receiving and storing a number of record members, and adapted to have said record members unloaded therefrom, said apparatus comprising a housing having:

a. a first side opening of sufficient size to allow insertion of said number of record members thereinto;
b. a second side opening of sufficient size to allow passage of one of said record members therethrough;
c. a surface having a first recess communicating with said first side opening for facilitating manual unloading;
d. a surface having a second recess communicating with said first recess for facilitating mechanical unloading;
e. orientation means for insuring proper orientation for mechanical loading and unloading;
f. worm groove means adjacent said first opening for insuring proper positioning for mechanical loading;
g. retaining means for releasably maintaining said record members therein; and
h. actuating means for initiating mechanical unloading.

5. An apparatus according to claim 4 wherein said first and second side openings are substantially at right angles.

6. An apparatus according to claim 4 further comprising means for preventing unloading of said record members from said second side opening.

7. An apparatus according to claim 4 wherein said housing is comprised of cooperating top and bottom enclosure means.

8. An apparatus according to claim 4 wherein said first recess is substantially arcuate in shape.

9. An apparatus according to claim 8 wherein said second recess comprises an elongated slot opening in said first recess and extending from said first recess.

10. An apparatus according to claim 9 wherein both said top and bottom enclosure means have a surface having a first recess communicating with said first side opening for facilitating manual unloading.

11. An apparatus according to claim 10 wherein both said top and bottom enclosure means have a second recess communicating with said first recess for facilitating mechanical unloading.

12. An apparatus according to claim 9 wherein an inside edge of said first recess is bevelled for facilitating manual loading.

13. An apparatus according to claim 4 wherein said orientation means is comprised of an outwardly extending rib on a side of said housing opposite said second side opening.

14. An apparatus according to claim 3 further comprising handle means associated with a side of said housing opposite said first side opening.

* * * * *